Feb. 5, 1957

J. LONG 2,780,179

AUXILIARY LOAD SUPPORT

Filed June 4, 1954

INVENTOR.
JAMES LONG
BY
ATTY.

2,780,179

AUXILIARY LOAD SUPPORT

James Long, Beloit, Wis., assignor to Fairbanks, Morse & Co., Chicago, Ill., a corporation of Illinois Application June 4, 1954, Serial No. 434,567

4 Claims. (Cl. 105—199)

This invention relates to improvements in load support means, and has particular reference to an improved load support structure adaptable for use in lateral support of a rail vehicle frame relative to the vehicle wheel truck, wherein the structure is especially suitable to afford such lateral support in relatively heavy railway vehicles such as diesel-electric locomotives and the like.

Figure 1:
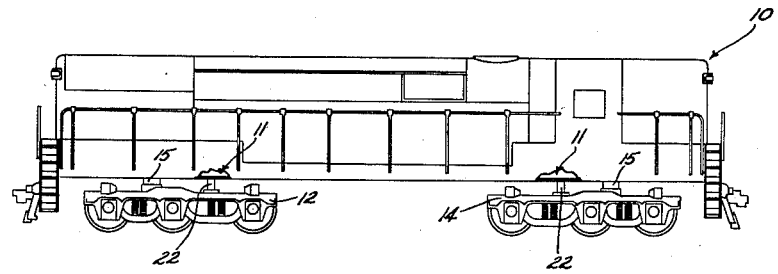
Figure 2:
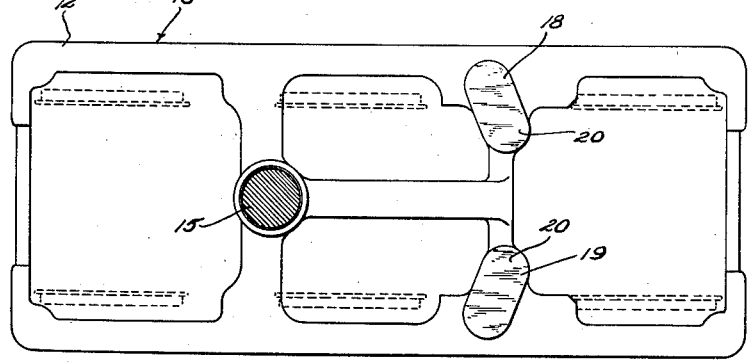
Figure 3:
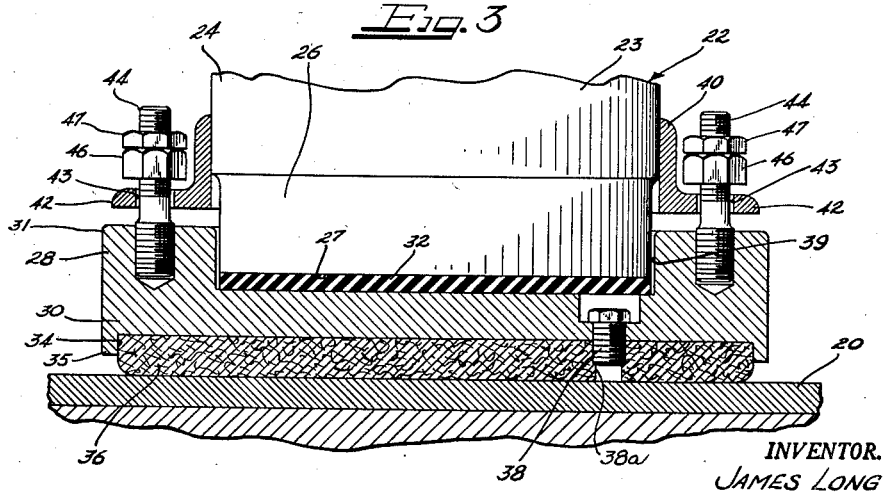

The nature of the present improvements, as well as the objects and advantages of the invention, will become apparent from consideration of the following description of a presently preferred embodiment thereof as such is exemplified in the accompanying drawing, wherein:

Fig. 1 is a view in side elevation of a diesel-electric locomotive illustrating the presently improved support means in application between the locomotive frame and each wheel truck;

Fig. 2 is an enlarged top plan view of a wheel truck frame, showing load bearing members thereon with which the present improved support means cooperate in lateral support of the locomotive frame, and Fig. 3 is a greatly enlarged view in vertical section through a support means constructed in accordance with the present invention (one element thereof appearing in side elevation), the support means being shown in application to its associated one of the truck-carried load bearing members, with the latter shown in fragmentary vertical section.

Referring to the drawing, the diesel-electric locomotive 10 illustrated in side elevation in Fig. 1, may be of any well known construction including a frame, usually referred to as an underframe, portions of which are shown at 11 above the respective wheeled trucks 12 and 14. Each truck is swivelly related in supporting relation to the locomotive frame through the usual center-pin or king-pin indicated at 15, the center-pin in the present example being located relative to the truck structure 16 substantially as shown in Fig. 2. Included in each truck structure are a pair of hardened steel plate members 18 and 19 (Fig. 2) constituting load bearing members, each providing a horizontal planar bearing face or surface 20 near one side of the truck inwardly adjacent one end thereof. The bearing surfaces 20 are elongated in the direction shown and are located such that the centers thereof are substantially equi-distant from the axis of the king-pin 15.

Cooperating with each of the load bearing members 18 and 19 is a load support device indicated generally at 22 (Fig. 1), carried by the vehicle frame at the side thereof and bearing in slidable contact upon the surface 20 of the associated bearing member, whereby to afford lateral support of the frame relative to the underlying truck. Such support is auxiliary to the main king-pin support of the frame, and is effective through the sliding contact of the device on surface 20, in any angular or turning position of the truck relative to the frame normally to be encountered in rail operation of the locomotive. To this end, the elongate extent of each surface 20 is selected so that device 22 will not leave the surface in maximum turning of the truck.

Turning now to the improved load support device 22, since the pair of such devices in lateral support of the frame on truck 12 and the pair thereof associated with truck 14 are identical in structure and function, a description of one will apply equally to each of the others. The device, as shown in detail by Fig. 3, comprises a support member 23 carried by the locomotive frame 11 in suitable rigid connection thereto, the member depending from the frame in the region thereof over the truck plate surface 20 with which it is associated. Member 23 which is of predetermined load transmitting capacity fully adequate for the intended lateral support of the locomotive (through its frame) relative to the truck, preferably is of cylindrical form in its main body portion 24, and provides a somewhat reduced-diameter cylindrical terminal end portion 26. Portion 26 presents an end face or surface 27 which may be flat or planar as shown, in spaced opposed relation to the underlying surface 20 of the associated truck-carried bearing member (18 or 19).

Enclosing or embracing the terminal portion 26 is a rigid cup-shape or cap member 28 providing a cap body 30 and circular side flange 31. Within the cap between the cap body and the end face 27 of support member portion 26, is a disc-shape member or pad 32 of an extent to engage over substantially the whole area of end face 27, the pad being formed of suitable selected material characterized by a desired degree of yieldability or compressibility under load. Body 30 of the cap member 28 is formed to provide a recess 34 in its lower side, forming the annular side flange 35, and seated in the recess under lateral confinement therein by the flange 35 is a circular or disc-shape bearing shoe 36. Shoe 36 is detachably carried by the cap member in any suitable manner as by bolts or studs one of which is indicated at 38 in threaded connection to the shoe. As shown, the shoe is in slidable, load transmitting engagement with or upon the surface 20 of the associated truck-carried bearing member. Since in the normal function of the lateral support as thus far described, the shoe 36 will bear with very considerable pressure upon the surface 20, it is constructed to accommodate high bearing pressures on the surface 20 while permitting relative sliding movements of the shoe and surface in truck turning relative to the locomotive frame. To this end, the shoe 36 is formed of material suitable to the purpose, as molded cotton fibre, which material is impregnated with graphite or other appropriate lubricant suitable for facilitating relative sliding displacements of the shoe and plate surface 20. It is noted here that since the shoe is comprised of a lubricant impregnated material, each bolt opening or bore 38a in the shoe may be of a diameter sufficiently less than that of the bolt 38 (as shown in Fig. 3), such as to provide for self-threading of the bolt into the shoe bore 38a.

It will be appreciated that in the operation of the lateral support provision, the planar face 27 of the frame-carried support member 23 and the planar surface 20 of the associated truck-carried plate member will undergo relative displacements out of parallelism, as a result of any one or more of a number of factors including track unevenness and truck turning movements. Therefore, the present lateral support device is adapted to compensate for such out of parallel relationship of the indicated surfaces, in a manner to assure under all normal locomotive operating conditions, full-surface engagement of the bearing shoe 36 upon the plate surface 20. To this end the cap member 28 is dimensioned with respect to the diameter of the terminal end portion 26 of support member 23, such as to effect a predetermined appreciable annular clearance space 39 between the peripheral surface of portion 26 and the inner annular surface of cap flange 31. Thus this clearance space together with the compression yieldability of the pad 32, permits angular or rocking displacements of the cap member 28, as well as axial displacements thereof, relative to the terminal portion 26, so that the cap is self-adjustable for maintaining full-surface contact of its shoe 26 on plate surface 20.

Cap member 28 is retained in the above described operative association with terminal portion 26 by suitable means such as illustrated in Fig. 3. As there shown, a ring element 40 is sleeved on and secured to the larger diameter body 24 of support member 23 near the juncture thereof with the reduced diameter terminal portion 26. Ring 40 provides an outstanding annular flange 42 adequately spaced above the cap flange 31 and having openings 43 therein to receive studs 44 therethrough. The studs 44 are in threaded connection to the flange 31 of cap member 28, and are threaded at their upper ends to receive stop nuts 46 fixed in adjusted positions by lock nuts 47. The ring flange openings 43 are provided to have sufficient clearance relative to the studs extending therethrough, while the stop nuts 46 are adjusted to positions spaced above the ring flange in the normal operative condition of the cap member 28, such as to afford full freedom of the cap member 28 to undergo the heretofor indicated angular or rocking displacements, as well as axial displacements. It will be appreciated, of course, that the flanged ring and stud arrangement effectively prevents inordinate displacements of the cap member relative to support member 23.

The improved support device as now described in respect to the herein illustrated embodiment thereof, affords an effective provision for effecting lateral support of a locomotive structure relative to the underlying wheel truck. While the invention is shown in application to a rail locomotive for augmenting main or king-pin support of the frame on the trucks by providing lateral support of the frame relative to the trucks, it may be applied in similar manner and for like purpose, to rail or other vehicles, or to load supporting uses other than in connection with vehicles.

What is claimed is:

1. In a rail vehicle providing a vehicle frame and including a wheeled truck and center-pin means supporting the frame on the truck, auxiliary means spaced from said center-pin means for effecting lateral support of the frame relative to the truck, said auxiliary means including means providing a planar load bearing surface on the truck, a support member carried by the vehicle frame and providing a terminal end having a planar face in relatively spaced overlying relation to said planar load bearing surface, a cap member enclosing said terminal end, compressible means between the cap member and said planar face of the terminal end, said cap member being formed to have lateral clearance relative to said terminal end for permitting rocking displacement thereof relative to the terminal end, and a bearing shoe secured to said cap member for slidable engagement upon said planar load bearing surface.

2. In a rail vehicle providing a vehicle frame and including a wheeled truck and center-pin means supporting the frame on the truck, auxiliary means for lateral support of the frame relative to the truck, comprising plate members on the truck one near each side thereof, the plate members providing planar load bearing surfaces substantially equally spaced from said center-pin means, and frame-carried support means in operative cooperation with each of said plate members, each support means comprising a member depending from the frame and providing a cylindrical terminal end having a planar end face in spaced opposed relation to the planar load bearing surface of the associated plate member, a cap member embracing said cylindrical terminal end, compressible means between the cap member and the planar end face of said terminal end, said cap member being formed to have lateral clearance relative to said cylindrical terminal end for permitting rocking displacement thereof relaitve to the terminal end, means between said terminal end and said cap member adapted for retaining the cap member in embracing relation to said terminal end while permitting said rocking displacement of the cap member, and a lubricant-impregnated bearing shoe secured to the cap member for slidable engagement upon the planar load bearing surface of the associated plate member.

3. A load support of the character described for operative cooperation with a load bearing member having a bearing surface, comprising a support member carried by the load to be supported and having a cylindrical terminal end portion providing an end face in spaced opposed relation to the bearing surface of said load bearing member, a cap member embracing said terminal end portion, yieldable means between the cap member and said end face of the terminal end portion, said cap member being formed to have lateral clearance relative to said terminal end portion, a lubricant-impregnated bearing shoe secured to the cap member for slidable engagement with said bearing surface of the load bearing member, the lateral clearance of the cap member relative to said terminal end portion together with said yieldable means permitting axial and rocking displacements of the cap member relative to said cylindrical terminal end portion, and adjustable means between said support member and said cap member, effective for limiting axial and rocking displacements of the cap member.

4. A load support of the character described, provided for operative cooperation with a load bearing member having a planar bearing surface, the load support comprising a support member on the load to be supported and having a terminal portion providing a planar end face opposed to said planar bearing surface, a rigid member providing a body portion opposed to said planar end face and a marginal flange circumferentially about the terminal portion of said support member, said flange being formed to have lateral clearance relative to said terminal portion, a compressible pad between said body portion and said planar end face, a lubricant-impregnated bearing shoe secured to the body portion of said rigid member for slidable engagement upon the planar bearing surface of said load bearing member, said lateral clearance of the flange relative to said terminal portion together with said compressible pad permitting axial and rocking displacements of said rigid member relative to the terminal portion of said support member, and adjustable means between said support member and the flange of said rigid member, effective for limiting axial and rocking displacements of said rigid member.

References Cited in the file of this patent

UNITED STATES PATENTS

| | | |
|---|---|---|
| 2,242,852 | Flowers | May 20, 1941 |
| 2,514,034 | Dean | July 4, 1950 |
| 2,602,401 | Flowers | July 8, 1952 |